United States Patent
Santos Garcia et al.

(10) Patent No.: US 12,521,010 B2
(45) Date of Patent: Jan. 13, 2026

(54) PORTABLE SYSTEM FOR IDENTIFYING POTENTIAL CASES OF DIABETIC MACULAR OEDEMA USING IMAGE PROCESSING AND ARTIFICIAL INTELLIGENCE

(71) Applicant: CENTRO DE RETINA MEDICA Y QUIRURGICA, S.C., Zapopan (MX)

(72) Inventors: Arturo Santos Garcia, Zapopan (MX); Juan Carlos Altamirano Vallejo, Zapopan (MX); Luis Manuel Aparicio Romero, Zapopan (MX); Alejandro Garcia Gonzalez, Zapopan (MX); Ricardo Javier Diaz Dominguez, Zapopan (MX); Rita Quetziquel Fuentes Aguilar, Zapopan (MX); Gisela Hialita Sanchez Sosa, Zapopan (MX)

( * ) Notice: Subject to any disclaimer, the term of this patent is extended or adjusted under 35 U.S.C. 154(b) by 1015 days.

(21) Appl. No.: 17/256,937

(22) PCT Filed: Apr. 12, 2019

(86) PCT No.: PCT/MX2019/000036
§ 371 (c)(1),
(2) Date: Dec. 29, 2020

(87) PCT Pub. No.: WO2020/005053
PCT Pub. Date: Jan. 2, 2020

(65) Prior Publication Data
US 2021/0259546 A1    Aug. 26, 2021

(30) Foreign Application Priority Data

Jun. 29, 2018  (MX) .................. MX/a/2018/008165

(51) Int. Cl.
*A61B 3/12* (2006.01)
*A61B 3/00* (2006.01)
(Continued)

(52) U.S. Cl.
CPC .............. *A61B 3/12* (2013.01); *A61B 3/0041* (2013.01); *A61B 5/0013* (2013.01); *A61B 5/002* (2013.01);
(Continued)

(58) Field of Classification Search
CPC ....... A61B 3/0041; A61B 3/12; A61B 3/1208; A61B 3/13; A61B 5/0013; A61B 5/002;
(Continued)

(56) References Cited

U.S. PATENT DOCUMENTS 10,052,016 B2 *   8/2018   Ehlers ................. G06V 40/197
10,628,940 B2 *   4/2020   Srivastava ............ G06T 7/0016
(Continued)

FOREIGN PATENT DOCUMENTS

CN   104881862 A   9/2015
CN   105761254 A   7/2016
(Continued)

*Primary Examiner* — Zhiyu Lu
(74) *Attorney, Agent, or Firm* — Feeney IP Law; Alan F Feeney; Logan D Faucher

(57) ABSTRACT

Diabetes is a disease characterized by high levels of blood glucose. It is important to keep diabetes under control to avoid short- and long-term complications. Diabetes can affect vision due to the alterations it produces in the blood vessels of the retina. This is known as Diabetic Retinopathy (DR), which is one of the leading causes of impaired vision in developed countries. One of the complications of diabetic retinopathy is Diabetic Macular Edema (DME), which is the leading cause of vision loss in diabetic patients and can appear at any stage of diabetic retinopathy. This consists of the gradual accumulation of fluid in the macula, the most (Continued)

important area of the retina. The determination of diabetic macular oedema is very important for the retina. The determination of diabetic macular oedema is very important for adequate treatment of this condition. A variety of technological options are used for detecting diabetic retinopathy, although only the most sophisticated detect macular oedema, a complication that appears as a consequence of diabetic retinopathy and is one of the leading causes of blindness. The invention describes a portable system for detecting diabetic macular oedema by capturing a fundus image using a portable ophthalmoscope; said image is sent via wired or wireless means to an embedded system that has an algorithm based on artificial intelligence, which extracts information from the image and processes same to identify the presence of the condition being studied.

4 Claims, 5 Drawing Sheets

(51) Int. Cl.
*A61B 5/00* (2006.01)
*G06T 3/40* (2006.01)
*G06T 3/60* (2006.01)

(52) U.S. Cl.
CPC .......... *A61B 5/4878* (2013.01); *A61B 5/7264* (2013.01); *G06T 3/40* (2013.01); *G06T 3/60* (2013.01)

(58) Field of Classification Search
CPC ............ A61B 5/14532; A61B 5/14555; A61B 5/4878; A61B 5/7264; G06T 3/40; G06T 3/60; G06T 7/62

See application file for complete search history.

(56) References Cited

U.S. PATENT DOCUMENTS

| | | | |
|---|---|---|---|
| 2011/0242306 A1* | 10/2011 | Bressler | A61B 3/0025 382/128 |
| 2011/0299036 A1* | 12/2011 | Goldenholz | A61B 3/1208 351/206 |
| 2012/0229617 A1* | 9/2012 | Yates | A61B 3/1208 348/78 |
| 2012/0287255 A1* | 11/2012 | Ignatovich | A61B 3/1208 348/78 |
| 2014/0079297 A1* | 3/2014 | Tadayon | G06V 40/172 382/118 |
| 2016/0338583 A1* | 11/2016 | Uchida | A61B 3/18 |
| 2018/0140180 A1* | 5/2018 | Coleman | G06T 7/0012 |
| 2018/0204111 A1* | 7/2018 | Zadeh | G06V 10/764 |
| 2018/0220889 A1* | 8/2018 | Dirghangi | A61B 3/185 |
| 2018/0346407 A1* | 12/2018 | Bavik | A61K 31/35 |

FOREIGN PATENT DOCUMENTS

| | | |
|---|---|---|
| CN | 106097378 A | 11/2016 |
| CN | 106204555 A | 12/2016 |
| CN | 104835150 B | 6/2018 |
| UA | 86083 U | 12/2013 |
| WO | WO-2017179495 A1 | 10/2017 |

* cited by examiner

PORTABLE SYSTEM FOR IDENTIFYING POTENTIAL CASES OF DIABETIC MACULAR OEDEMA USING IMAGE PROCESSING AND ARTIFICIAL INTELLIGENCE

CROSS-REFERENCE TO RELATED APPLICATIONS

This application is a continuation under 35 U.S.C. § 371 of International Application No. PCT/MX2019/000036 filed on Apr. 12, 2019 that claims priority to Mexican Application No. MX/a/2018/008165 filed on Jun. 29, 2018. The entire contents are incorporated herein by reference.

FIELD OF THE INVENTION

The present invention is related to the field of medicine, particularly to a system for detecting diabetic macular oedema by capturing a fundus image using a portable ophthalmoscope where the macular area is analyzed; said image is sent via wired or wireless means to an embedded system that has an algorithm based on artificial intelligence, which extracts information from the image and processes same to identify the presence of the condition being studied. The system is designed for professionals with training in optometry or first-contact health professionals who do not have specialized training in ophthalmology.

BACKGROUND OF THE INVENTION

Macular oedema is the swelling and accumulation of fluid in the macula, which is the part of the eye responsible for central vision and fine, detailed vision (which allows you to read or recognize faces) and occurs when the blood vessels of the retina have fluid leaks.

The most common macular oedema is that associated with diabetic retinopathy (DR), although many retinal pathologies can cause macular oedema, such as venous occlusions, or in the postoperative period of cataract surgery.

Diabetes is a disease that is characterized by high levels of glucose (sugar) in the blood. It is important to keep diabetes under control in order to avoid complications in the short and long term. One of the organs that can be significantly affected is the eyes. Diabetes can affect vision due to changes in the blood vessels in the retina. This is known as Diabetic Retinopathy (DR), which is one of the primary causes of low vision in developed countries. One of the complications of diabetic retinopathy is Diabetic Macular Edema (DME), which is the leading cause of visual loss in diabetic patients and can appear at any stage of Diabetic Retinopathy. It consists of the progressive accumulation of fluid in the macula, the most important area of the retina.

As mentioned above, the main cause of the appearance of macular oedema is associated with diabetes. This disease causes the blood vessels in the retina to lose fluids, including small amounts of blood, and occasionally to leak fat deposits, causing the macula to become inflamed. Macular oedema is usually painless and may exhibit few symptoms at first-mainly blurred and discolored vision—but it must be treated in time in order to prevent irreversible degenerative changes. Multiple treatment options exist, such as eye drops, intravitreal and periocular injections, laser photocoagulation, MicroPulse laser, or posterior vitrectomy microsurgery, which will be applied depending on the severity of each case.

Diabetic macular oedema and its symptoms occur more frequently in poorly controlled patients. Among the first symptoms is the loss of visual acuity or blurred vision that is gradually progressive, poor night vision, difficulty in recovering from bright stimuli, and decreased color vision.

In order to detect whether a diabetic person has Macular Edema (or any other complication due to Diabetic Retinopathy), it is necessary to perform a complete eye examination, which includes a visual acuity check, eye pressure measurement, a complete review of the structures of the eye, and dilation of the pupil in order to fully see the retina. If data are identified that suggest the presence of Diabetic Macular Edema, complementary tests such as retinal fluorescein angiography and optical coherence tomography can be performed.

Diabetic retinopathy and diabetic macular oedema are important causes of blindness in people of working age between 20 and 65 years. The decrease in and loss of vision impedes the development of close-up activities such as reading, writing, and sewing, among others, and far-off activities such as driving, watching television, reading signs, etc. Additionally, it affects the peripheral vision and color vision. As a result, those affected become dependent on others and suffer adverse changes in their social and emotional lives. It is important to detect diabetic macular oedema early on, since that enables it to be treated with innovative drugs that can preserve vision. The conventional approach taken by an ophthalmologist who makes a diagnosis of macular oedema is to apply a focal laser treatment in order to reduce the swelling of the macula. During this laser surgery, the ophthalmologist applies many tiny pulses to the areas around the macula that are leaking fluid. The primary objective of treatment is to stabilize the vision by sealing fluid leaks from the blood vessels that interfere with the proper functioning of the macula. In some cases, a loss of vision can be improved with laser treatment. Drug injection therapy is also used to treat macular oedema. Steroids and anti-endothelial growth factor (anti-VEFG) agents have shown a promising response in reducing macular oedema from diabetes and other causes. Drug injection therapy is administered in the doctor's office. In these cases, a type of anesthesia is used to numb the eye, and a very small needle is inserted into the eye to deliver the medicine close to the retina.

In patients with diabetes, controlling blood sugar and blood pressure is another method of treatment for macular oedema. The Early Treatment Diabetic Retinopathy Study (ETDRS) introduced the term "clinically significant diabetic macular oedema," which is defined as:
 1. Retinal thickening 500 microns or less from the center of the fovea.
 2. Hard exudates 500 microns or less from the center of the fovea if associated with adjacent retinal thickening.
 3. Retinal thickening of at least one disc area, a portion of which is within one disc diameter of the center of the fovea.

According to the ETDRS, those patients whose oedema could be classified as clinically significant would benefit from laser treatment, hence the importance of this classification.

More recently, the International Classification of Diabetic Retinopathy proposes three grades with regard to diabetic macular oedema:
 1. Mild. Retinal thickening or hard exudates at the posterior pole but away from the center of the macula.
 2. Moderate. Closeness of the thickening or exudates to the center of the macula.

3. Severe. Exudates or thickening affect the center of the macula.

The conventional method used to diagnose diabetic macular oedema has been biomicroscopic examination. The problem with this method is that the information it provides is exclusively qualitative and subjective. Visualizing the hard exudates is not a problem, but detecting the presence of retinal thickening can be more complex, and the findings can be highly variable depending on the observer. What is more, these methods are not very sensitive, since large variations in the thickness of the retina are needed in order to be detected by biomicroscopic examination.

The determination of diabetic macular oedema is very important in order for adequate treatment of this pathology to be administered. A variety of technological options exist which are used to detect diabetic retinopathy, although only the most sophisticated involve the detection of macular oedema, a complication that appears as a consequence of diabetic retinopathy and is one of the primary causes of blindness. Most of these alternatives use the capture of the fundus image (two-dimensional information) and, in the case of the specialist physician, the three-dimensional reconstruction of the fundus. In both cases, they are optical media; in the first, fundus images are captured using a portable camera, or, by placing an attachment on a smartphone, the expert or an automated algorithm identifies characteristics in the captured image. These characteristics are generally associated with advanced stages of diabetic retinopathy, such as specific color changes or changes in the morphology and structure of the retina, which are identifiable in a simple image of the fundus of the eye. Frequently, the diagnosis is not made on site, but rather the image is sent to a remote diagnostic center where it is analyzed by a group of ophthalmology specialists. The image can be taken by a person trained in capturing and not necessarily by a specialist in the medical area. In the second type, the main requirement is that it be carried out by a specialist in the area of ophthalmology, the options being: fundus image capture systems with implementation of a deep learning algorithm for the automatic classification of diabetic retinopathy in its moderate and severe forms. And, in the most specialized case, optical coherence tomography is used, which reconstructs the three-dimensional structure of the eye using infrared radiation, this latter case making it possible not only to identify retinopathy in general but also macular oedema in particular. These studies are carried out in the specialist's office and lack portability. In addition to the above, other devices that exist on the market for analyzing this pathology include:

The Peek Vision® System, which is composed of tools and processes designed for eye health services. This system has the following important components: a diagnostic app (smartphone software), an optical adapter for the phone's camera (magnifying lens) that allows viewing of the retina, and a system that links the diagnostic test and data of the image to a remote system for diagnosis. Unlike the invention that is the subject of this document, the Peek Vision® system, in situ, can only perform a visual acuity study. In order to diagnose other pathologies, the image has to be sent to a diagnostic center through the internet. In addition, this system is not designed to identify diabetic macular oedema, but rather only the presence or absence of proliferative diabetic retinopathy through the symptoms it generates; optical coherence tomography equipment in a specialized care center is required in order to confirm the diagnosis.

Optical Coherence Tomograph (OCT) is a diagnostic imaging device that enables high resolution images of biological tissues to be obtained. It is characterized by the creation of micrometric cross sections by means of light on the tissue to be studied. OCT operation employs a computerized precision optical instrument that is capable of obtaining high-resolution images. OCT is especially useful in ophthalmology, given the ease with which light reaches the ocular structures in the anterior and posterior segment. The advantage inherent to its application in ophthalmology is that the light falls directly on the tissue without the need to use a transducer. This requires an optical medium that is sufficiently transparent to obtain a detectable signal. Unlike the invention that is the subject of this document, this device allows for generation of a 3D reconstruction of the eyeball, and the value of the retinal thickening around the macular area (diabetic macular oedema) can be displayed using specialized software. Such a study is performed by a specialist in an office, who interprets the color scale graphics displayed by the device interface; the developed system does not require the use of a specialist.

IDx-DR system. This is a system for the automatic detection of mild diabetic retinopathy in adults from 22 years of age who have been diagnosed with diabetes mellitus. This system is used in a complementary manner with a model TOPCON NW400 non-mydriatic fundus camera cabinet, which is not portable; the images are analyzed using deep learning techniques.

Unlike the invention that is the subject of this document, the IDx-Dr System provides a pre-diagnosis that is categorized into two levels: mild and severe retinopathy. In general, our invention is used to infer macular thickness. Using this information, it is possible to classify the damage by region of the retina, at least in nine primary sectors and on a scale of mild, moderate, and severe damage by region, with the presence of damage as one gets farther away from the center indicating a greater degree of progression of the pathology. The developed invention has the characteristic of portability without depending on a desktop mydriatic camera.

In general terms, current systems have the following drawbacks compared to the developed invention that is the subject of this document:

1. In order to detect diabetic macular oedema, current systems use non-invasive and interferometric optical tomographic imaging techniques, which offer a penetration of millimeters (approximately 2-3 mm into the tissue or material in question) with axial and lateral resolution on a micrometric scale. Although these devices are sophisticated and high resolution, they require interpretation by sub-specialists, not to mention that the price of the equipment is high.
2. Most of the current systems for detecting ophthalmological pathologies require that the information be sent to a diagnostic center.
3. Current systems do not detect diabetic macular oedema through fundus imaging, but rather generally diabetic retinopathy in two categories: moderate and severe.
4. Most of the current systems for detecting ophthalmological pathologies require a network connection in order to process the information.

Based on the analysis of prior art documents, there are inventions that attempt to solve similar problems, as is the case with the invention described in document UA86083, in which a method is presented for evaluating the type of diabetic macular oedema in a patient with type II diabetes mellitus. The system comprises complex ophthalmological examination and coherent optical tomography of the eye according to the Macular Thickness Map protocol. The ratio between the fovea and the center is calculated from the thickness of the retina in the fovea against the thickness of the central sector. A ratio of below 1.0 suggests occlusion-type diabetic macular oedema. A ratio of above 1.0 suggests non-occlusion-type diabetic macular oedema.

The essential invention of this document has the following features:

The system does not use Optical Coherence Tomography for diagnosis.

The system performs image processing and analysis "in situ" and does not require a network/cloud connection to execute the process, nor does it require the information to be sent for evaluation.

The system does not require the presence of a sub-specialist physician, since it is designed for professionals with training in optometry or first-contact health professionals who do not have specialized training in ophthalmology.

The system detects diabetic macular oedema in its early stages and not when it is already evident through the presence of lesions that are triggered by the pathology in its advanced stages.

It is the object of the invention to make available a portable system for detecting potential cases of diabetic macular oedema that allows diabetic macular oedema to be pre-diagnosed through the capture of a fundus image with a portable ophthalmoscopy device; this image is sent by wired or wireless means to an embedded system that has an algorithm based on artificial intelligence that extracts the information from the image and processes it in order to identify the presence of the pathology. The system is designed for professionals with training in optometry or first-contact health professionals who do not have specialized training in ophthalmology. The technical details of the developed invention are described below.

DETAILED DESCRIPTION OF THE INVENTION

The characteristic details of the portable system for identifying potential cases of diabetic macular oedema by means of image processing and artificial intelligence are clearly elucidated in the following description and in the accompanying illustrative drawings, with same reference signs serving to denote the same parts.

System Components.

Figure 1:
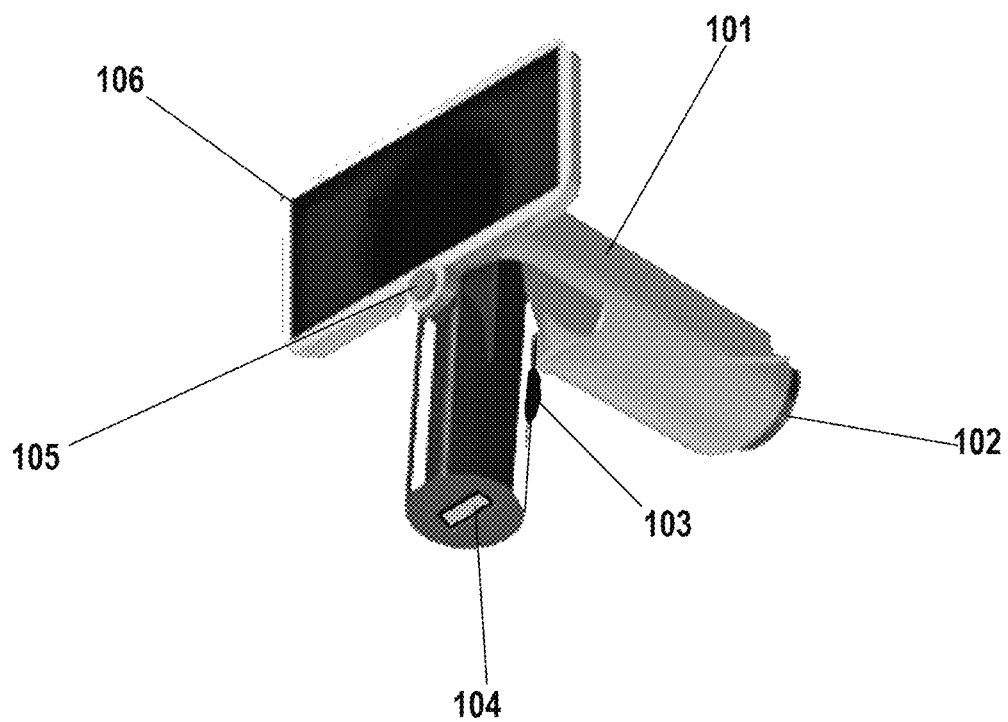
FIG. 1 shows the portable ophthalmoscopy device of the system for identifying potential cases of diabetic macular oedema.

The device has the following important components:

Portable ophthalmoscopy device (101) having at least the following technical characteristics is required in order to capture the image: a continuous field angle of 45° to 30°+35 D . . . 35 D. A 40 mm lens (102) (patient's eye-objective). At least 4 IR LEDs (each max. 100 mW). A 3.97" TFT LCD touch screen (106), 800×480 pixels, 16.7 million colors, anti-reflective film. A USB connection (104) and wireless connection, capture button (103) and power button (105), which can be equipment similar to the VISUSCOUT 100 from the Zeiss company. As shown in FIG. 1, this equipment captures the image that is sent to the embedded system for processing and analysis.

Figure 2:
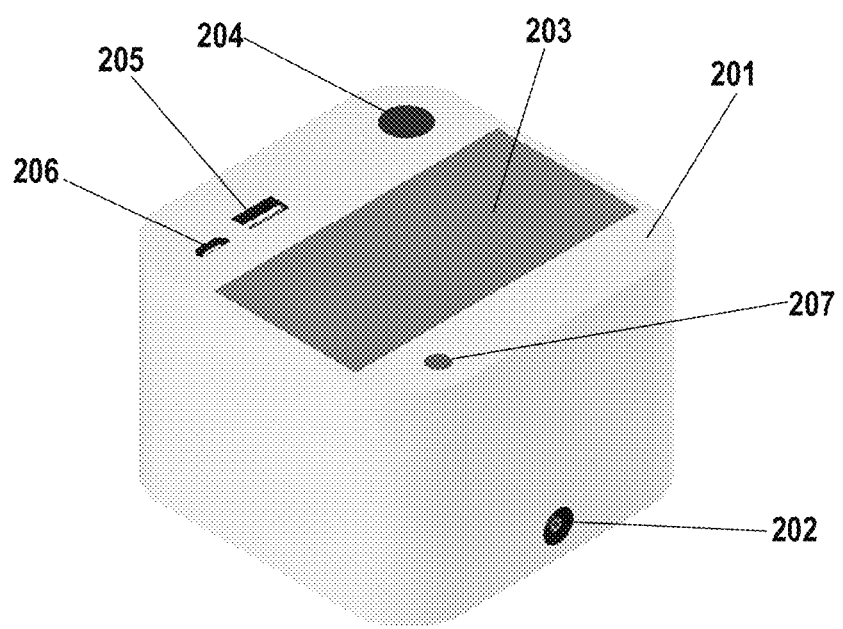
FIG. 2 shows the device with the development card and the embedded system developed for image processing.

Device with the development card and the embedded system referred to as the image processing device (201) as shown in FIG. 2, which includes an electrical connector (202), an LCD screen (203), a power indicator LED (207), a power button (204), a USB port (205), and a micro-USB port (206) for wired data transmission.

Figure 3:
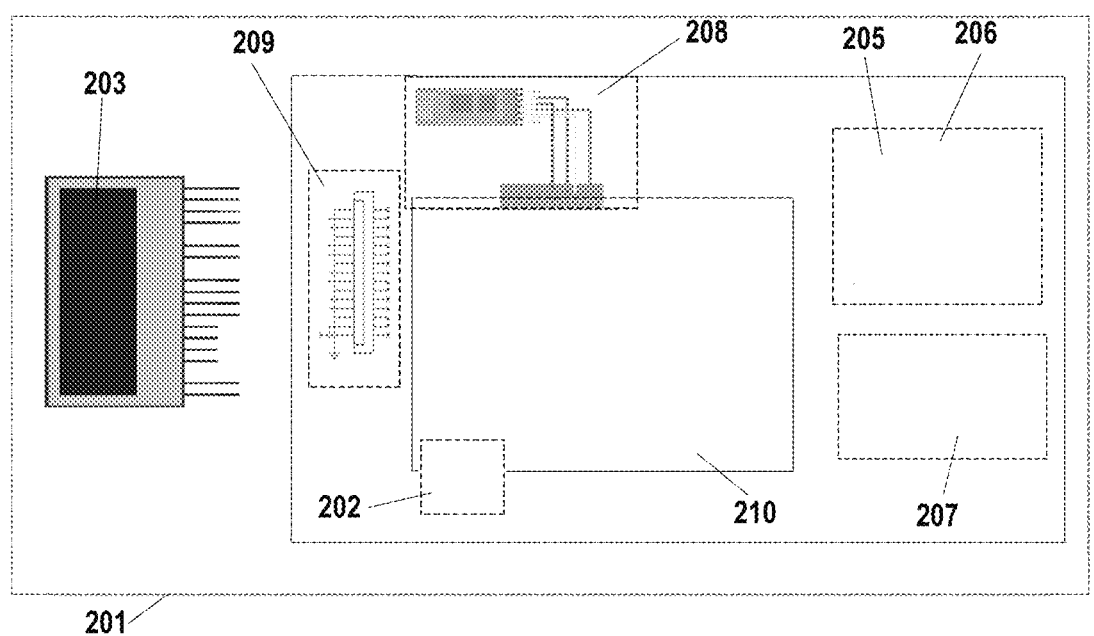
FIG. 3 shows a schematic diagram of the system for receiving the images and processing them.

A device with a development card and the embedded system for image processing which is integrated into the image processing device (201) as shown in FIG. 3, which includes the LCD screen (203) and the display port (209), electrical connector (202), wireless module (Bluetooth) (208) for wireless data reception and USB (205) and micro-USB (206) ports for wired data reception, an LED power indicator (207), and the 1.4 GHZ, 64-bit processor microprocessor (210) with 1 GB of RAM.

Figure 4:
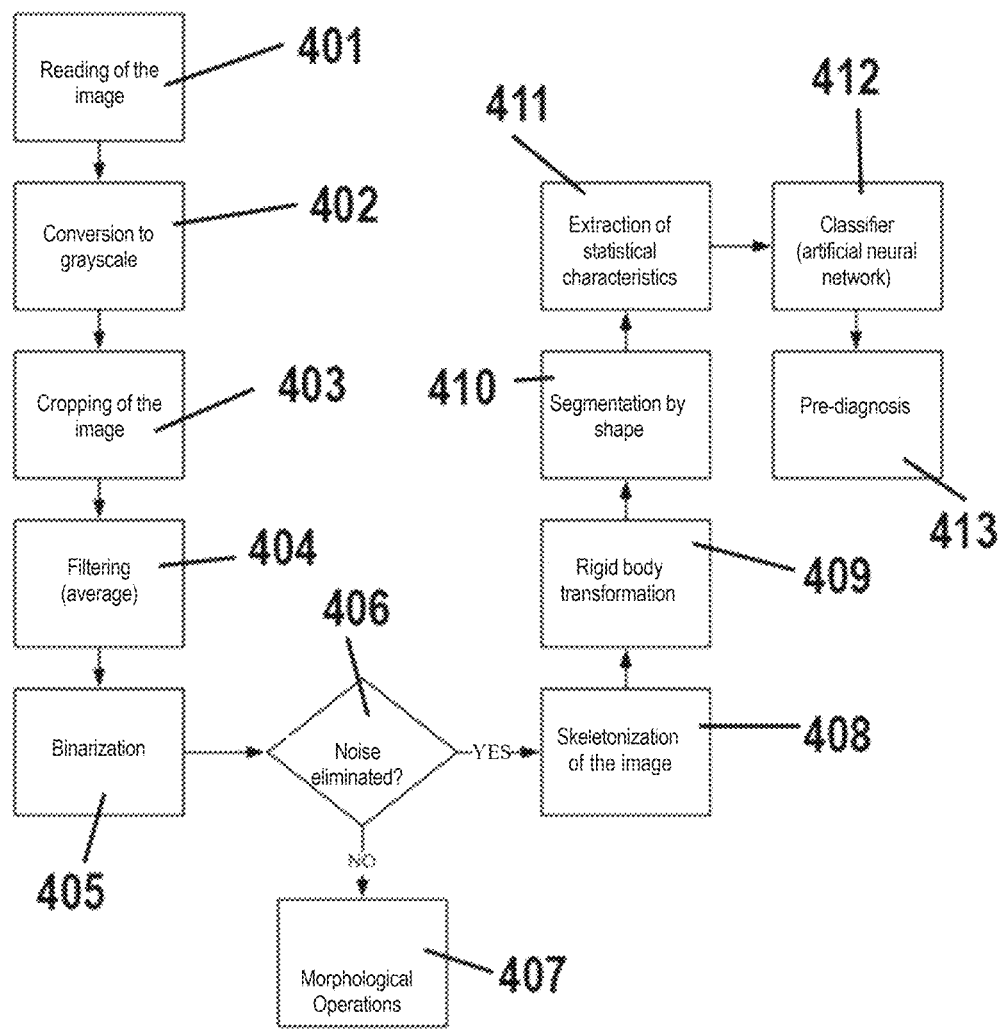
FIG. 4 shows the block diagram of the image processing algorithm that is embedded in the system for receiving the images and processing them.
Figure 5:
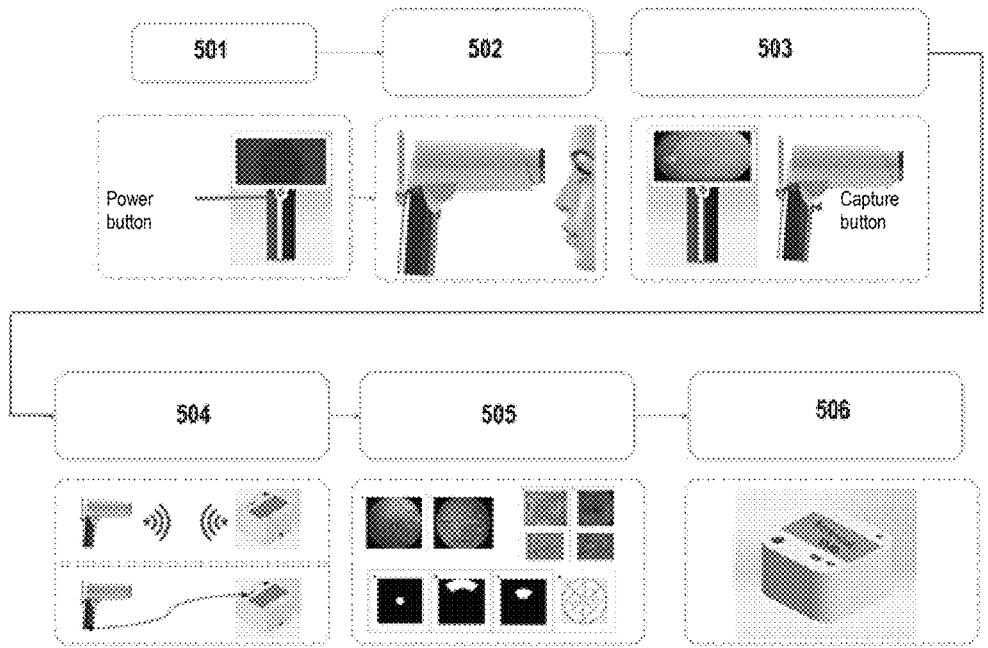
FIG. 5 shows the general steps of the operation of the portable ophthalmoscopy system of the system for identifying potential cases of diabetic macular oedema.

An algorithm for image processing for the pre-diagnosis of diabetic macular oedema shown in FIG. 4 and consisting of the following steps:

Reading of the image (401)

Conversion of the image to grayscale (402)

Let us consider a digital RGB fundus image represented by $I_{eye}(m; n)$, for demonstration purposes the iExaminer image, where $I_{eye}$ is a M×N image for m=1, 2, . . . , M and n=1, 2, . . . N, which can be decomposed into color components $R_{m,\,n}$, $G_{m,\,n}$ and $B_{m,\,n}$. For each component, $P_{m,\,n}$ is a specific pixel that can take a value from 0 to L, where L represents the maximum intensity value; for example, for an 8-bit resolution image, L=255.

Automatic selection of a region through detection of characteristics corresponding to vascular intersections from which the image is cropped (403). Automatic detection of vascular intersections is performed using a search algorithm based on changes in intensity gradients in the image components and an error minimization process, for which the following steps are performed:

Decomposition, scaling, and skeletonization of image components.

Figure 8:
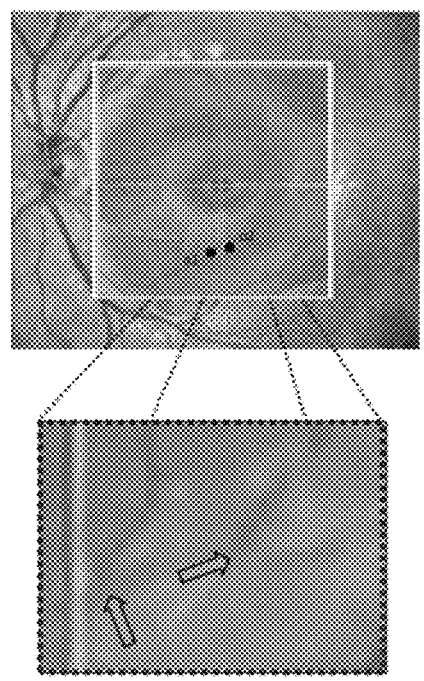
FIG. 8 shows the ROI and ocular vessel intersection points for $I_{oct}$ in an Optical Coherence Tomograph (OCT) image.

Search for changes in intensity through gradient changes, and morphological search for branches, Filling the vector of characteristics, Minimization of error, Counting of intersection points and definition of $I_{eye}$, Once $I_{eye}$ has been defined, the procedure applied is as follows:

A cropping operation is applied to $I_{eye}$ in order to generate an image $I_{roi}$ (i; j), where $I_{roi} \subset I_{eye}$ for $\alpha \leq i \leq M$ and $\beta \leq i \leq$ N, $\alpha \geq 1$, $\beta \geq 1$, $\alpha$, $\beta \in \mathbb{Z}$. As a necessary condition, $I_{roi}$ must contain two intersections of ocular vessels, $p_1$ ($x_{p1}$, $y_{p1}$) and $p_2$ ($x_{p2}$, $y_{p2}$), as shown by the yellow box in FIG. 8.

$$I_{gs}(i, j) = \frac{\sum_{s=1}^{3}\sum_{t=1}^{3} K_s(s, t) I_{rg}(i+s, j+t)}{\sum_{s=1}^{3}\sum_{t=1}^{3} K_s(s, t)}$$

Applying a media filter (404)

$$I_{gm} = \sqrt{(K_{Gx}(I_{gs}))^2 + (K_{Gy}(I_{gs}))^2}$$

$I_{ori}$ (i, j) becomes $I_{mg}$ (i, j), a grayscale representation,
where $p_{x, y} \in [0, L]$ for reducing the data set.
Considering K as a generic 3×3 kernel:
An averaged kernel ($K_s$) is applied over $I_{rg}$ in order to reduce the noise using:

$$K = \begin{bmatrix} k_{11} & k_{12} & k_{13} \\ k_{21} & k_{22} & k_{23} \\ k_{31} & k_{32} & k_{33} \end{bmatrix}$$

$$K_s = \frac{1}{9}\begin{bmatrix} 1 & 1 & 1 \\ 1 & 1 & 1 \\ 1 & 1 & 1 \end{bmatrix}$$

where $I_{gs}$ is the averaged image, $k_{22}$ is the center of the kernel.

Binarization of the image (405).

During image processing, the gradient is applied using directional kernels, considering $K_{Gx}$ and $K_{Gy}$ as directionals of 3×3 kernels, and the magnitude of the image gradient is obtained using:

$I_{gm}$ makes it possible to identify the local variation in the illumination and the direction of the changes of maximum intensity of gray for $I_{gs}$.

A decision is made as to whether the noise has been eliminated (406)

$I_{gm}$ is binarized using a dynamic threshold base using Otsu's method for the image histogram in order to generate $I_{bw}$.

$I_{fn}$ is the resulting noise-free image.

Removal of noise in the image through morphological operations and automatic identification of objects referred to as noise (objects with an area smaller than 200 pixels) (407)

Skeletonization of the noise-free image through morphological operations (408), identification of vascular intersections and measurement of the distance between them.

$I_{fn}$ is skeletonized using mathematical morphological operations. This process eliminates pixels at the boundaries of objects, but does not allow the objects to separate; this process is based on the preservation of the Euler number; in addition, the algorithm stores spatial coordinates of the intersections.

The final image is $I_{sk}$

Rigid body transformation consisting of image scaling, rotation, and translation (409)

Image feature segmentation and extraction (410)

Application of the artificial intelligence system:
Extraction of statistical characteristics (411), thereby obtaining: energy, entropy, homogeneity, contrast, brightness, correlation, average RGB, average R, average G, and average B of the image Classifier that makes use of an artificial neural network (412), first estimating the thickness of the macula and then classifying the result obtained Pre-diagnosis of diabetic macular oedema (413), which is carried out after the estimation of the macular thickness.

System Features.

The features of the developed system are as follows:
The developed system allows potential cases of diabetic macular oedema to be identified without having to perform an optical coherence tomography (OCT) study, which is the standard used worldwide for the detection of this pathology.

In turn, the system takes the processing into consideration in the embedded system without the need to send the information to a diagnostic center and/or specialists for review, since it can be used by professionals with training in optometry or first-contact health professionals who do not have specialized training in ophthalmology.

System Operation.

The general steps for the operation of the portable ophthalmoscopy device of the system for identifying potential cases of diabetic macular oedema are listed below:

1. The user takes the portable ophthalmoscopy device (101) and turns it on (501).
2. The portable ophthalmoscopy device (101) is positioned on the patient (502) and captures the fundus image (503). The image must have at least a 5 MP resolution, with a size of 1536×1152, in JPG, TIFF format, etc.
3. The user sends the fundus image to the embedded system by wired and wireless means (504). There is also the possibility of storing the image in a USB memory to be inserted into the port having the embedded diagnostic system.
4. The embedded system is achieved through image processing and extracts the characteristics thereof for classification (505).
5. Finally, the system displays the information on the presence/absence of the pathology on an LCD screen (506).

Finally, the following technical considerations had to be made for the development of the system:

In generating a capture protocol for the images used in the system, it was sought to establish that the images to be used should have the macular structure centered and be free of reflections and capture the presence of the ocular vascular arch, It was necessary to analyze/verify whether the characteristics of the images influence the characteristics that it is possible to extract from them. A comparative analysis was carried out between different image compression formats, resolutions, and sizes required by the system in order to extract the characteristics.

In the development of the system, the main problem that had to be solved was the validation of the response of the intelligent system. To do this, non-invasive studies were carried out on patients to verify the relationship between the information present in an image and the response offered by the gold standard for the identification of this pathology: optical coherence tomography.

System Verification.

Figure 6:
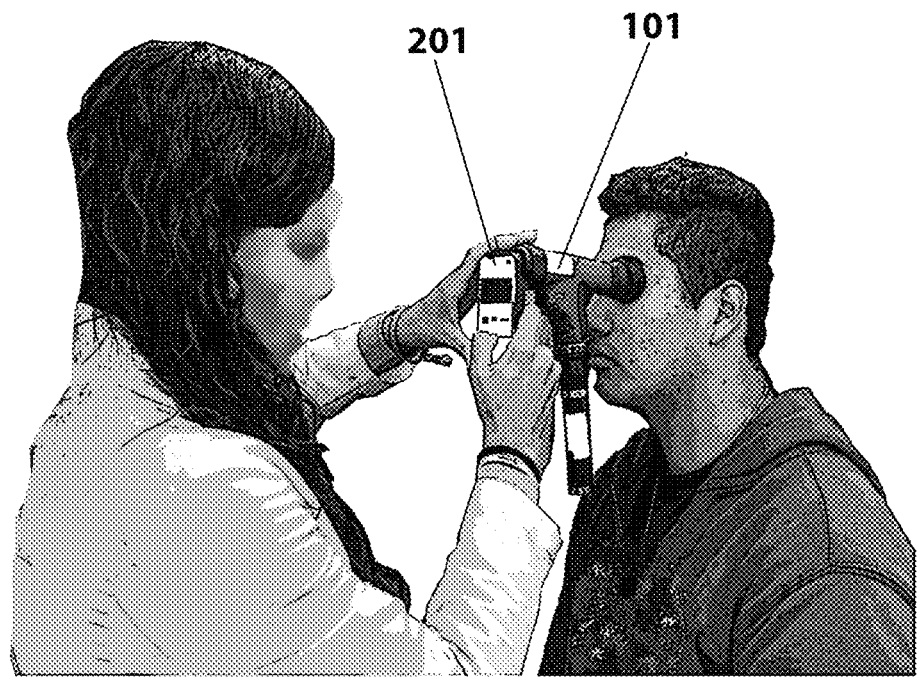
FIG. 6 shows a non-invasive clinical test with the portable ophthalmoscopy system of the system for identifying potential cases of diabetic macular oedema.

In order to ensure the precision of the system, a non-invasive clinical test was carried out in which the fundus images of 76 patients were obtained as shown in FIG. 6, with which the artificial intelligence system was adjusted. The procedures followed were in accordance with the Declaration of Helsinki of 1964, revised in 2004. The complete test was performed on 76 patients (40 without diabetic macular oedema, 10 with diabetic macular oedema, and 26 for a blind test). The inclusion criteria were:

Age from 20 to 60 years, suitable for pupil dilation, with or without diagnosis of diabetic macular oedema, and the willingness to provide a signed informed consent, The exclusion criteria were patients who were not found suitable for pupil dilation for medical or social reasons, Pupillary dilation less than 7 mm (clinical pupillary dilation).

History of previous laser therapy or subsequent segment surgery and presence of significant signs of opacity.

Figure 7:
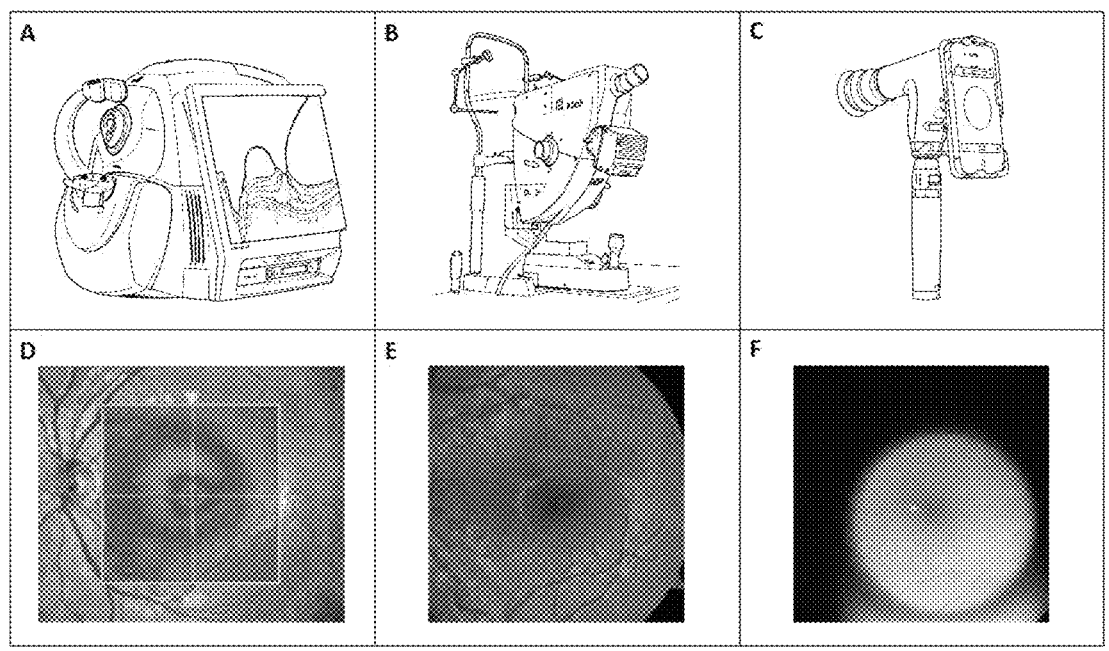
FIG. 7 shows the images used for the baseline of each patient in their study that includes the image of the Optical Coherence Tomograph (OCT), the retinograph and the system that includes the portable ophthalmoscopy device, and a smartphone with the developed algorithm.

Both eyes were dilated with a topical solution of 1.0% tropicamide and 2.5% phenylephrine. After twenty minutes, the pupils were examined to determine whether the dilation was adequate for the study. Then the Optical Coherence Tomography (OCT) images and retinography are captured. Each acquisition takes 5 minutes. In order to avoid inter-observer and intra-observer variation, only two trained individuals were assigned to perform the tests. These two technicians were trained by expert retinologists from the Centro de Retina Médica y Quirúrgica (CRMQ) during four two-hour sessions to perform ophthalmoscopy and learn the technique of capturing images of the fundus of the eye. Once a full study has been completed at the CRMQ, the database is composed of three images for each patient, as is shown in FIG. 7, this figure including the following:

A) OCT Zeiss Cirrus HD-5000,
B) Zeiss FF450 fundus camera,
C) Portable ophthalmoscopy equipment and a smartphone with the developed algorithm,
D) OCT image,
E) Image from the retinograph.
F) Image from the portable ophthalmoscopy exposure LED device and a smartphone with the developed algorithm.

The preceding description of the disclosed definitions is provided in order to enable any person skilled in the art to implement or use the present invention. Various modifications to these definitions and/or implementations will be readily apparent to those skilled in the art, and the generic principles defined herein may be applied to other embodiments without departing from the spirit or scope of the invention. Therefore, the present invention is not intended to be limited to the embodiments shown herein, but should be granted the broadest scope consistent with the following claims and the principles and novel features disclosed herein.

What we claim is:

1. A portable system for detecting potential cases of diabetic macular oedema by processing a fundus image comprising:
   a. a portable ophthalmoscopy device to capture the fundus image comprising:
      i. a continuous field angle of 45° to 30°, +35 D [[ . . . 11 to −35 D,
      ii. a 40 mm lens and at least 4 infrared light emitting diodes (IR LEDs) each having a maximum power of 100 mW,
      iii. a thin-film-transistor liquid-crystal display (TFT LCD) touch screen approximately 3.97 inches and uses approximately 800×480 pixels and 16.7 million colors further having an anti-reflective film designed to display an internal image of a human eye;
      iv. a universal serial bus (USB) connection and/or a short-range wireless connection used for exchanging data between mobile devices over a short distance,
      v. a capture button, wherein said capture button retains an image for processing and analysis, and
      vi. a power button,
   b. a portable, embedded imaging processing and analysis device having
      a development card;
      a liquid-crystal display (LCD) screen; and
      a universal serial bus (USB) or micro universal serial bus (USB) port and/or a short-range wireless connection module, wherein the development card is designed to process an image received from the portable ophthalmoscopic device using the serial bus USB connections of both the portable ophthalmoscopic device and the portable, embedded imaging processing and analysis device and/or the short-range wireless connection that is a short-range wireless interconnection of both the portable ophthalmoscopic device and the portable, embedded imaging processing and analysis device,
   wherein the liquid-crystal display (LCD) screen of the portable, embedded image processing and analysis device displays the processes image received from the portable ophthalmoscopic device; and
   wherein said imaging processing and analysis device with the development card further comprises:
      i. an electrical connector,
      ii. a light emitting diode (LED) power indicator,
      iii. a power button, and
      iv. a microprocessor designed to process the information contained in the image received from the portable ophthalmoscopic device, wherein the microprocessor is configured to read the image transmitted by the portable ophthalmoscopic device to create a greyscale conversion of the image received from the portable ophthalmoscopic device, and
   c. an artificial intelligence (AI)-based algorithm embedded in the portable, embedded imaging processing and analysis device that uses artificial intelligence for the in situ processing and analysis of the image of a diabetic macular oedema received from the portable ophthalmoscopy device that is in direct communication with the portable ophthalmoscopy device, wherein said algorithm comprises the following steps:
      i. reading of the image by wired or wireless means,
      ii. converting the image to grayscale,
      iii. automatically selecting a region through detection of characteristics corresponding to vascular intersections and thereafter cropping the image;
      iv. automatically detecting the vascular intersections using a search algorithm based on changes in intensity gradients in the image components;
      v. applying an error minimization process by performing the following steps:
         1. Decomposing, scaling, and skeletonizing the image, 2. Searching the image for changes in gradient intensity through gradient changes and morphologically searching for branches,
3. Filling a vector of characteristics,
4. Minimizing errors,
5. Counting intersection points,
vi. binarizing the image,
vii. determining whether or not noise has been eliminated,
viii. removing noise in the image using morphological operations and automatically identifying objects in the image having an area that is smaller than 200 pixels to create a noise-free image,
ix. skeletonizing the noise-free image using morphological operations, identifying vascular intersections and measuring the distance between the identified vascular intersections,
x. rigid body transforming consisting of image scaling, rotating and translating,
xi. image feature segmenting and extracting,
xii. applying the artificial intelligence system:
1. extracting statistical characteristics selected from the group consisting of energy, entropy, homogeneity, contrast, brightness, correlation, average RGB, average R, average G, and average B of the image,
2. Classifying by using a neural network, comprising the steps of:
    1) Estimating the thickness of a macula; and
    2) Classifying the estimated thickness of the macula;
3. Pre-diagnosing a diabetic macular oedema;
wherein the system detects potential cases of diabetic macular oedema as the system is designed to perform the following functions:
a. capturing an image of a fundus of an eye, wherein the image has a resolution of at least 5 megapixels (MP) and sized 1536×1152 pixels and the image is formatted as a Joint Photographic Experts Group (JPEG) or Tag Image File Format (TIFF) image file format,
b. sending the fundus image to an embedded system by wired or wireless means or storing the fundus image in a universal serial bus (USB) and/or micro-universal serial bus (USB) memory flash drive, wherein the USB memory flash drive is afterwards inserted into a port of the portable, embedded imaging processing and analysis device,
c. achieving an embedded system through image processing and extracting characteristics of the embedded system for classification, and
d. displaying pathology information on a liquid crystal display (LCD) screen;
wherein the greyscale conversion by the microprocessor of the fundus image received from-the portable ophthalmoscopic device, comprises the steps of
considering a digital RGB fundus image represented by $I_{eye}(m; n)$, where $I_{eye}$ is a M×N image for m=1, 2, . . . , M and n=1, 2, . . . N;
decomposing the fundus image into color components $R_{m,n}$, $G_{m,n}$ $B_{m,n}$; wherein each component, $P_{m,n}$ is a specific pixel with a value from 0 to L, wherein L represents the maximum intensity value, and
automatically selecting a region from the captured image by detecting features corresponding to vascular intersections from which the image is cropped;
automatically detecting vascular intersections by performing a search process based on the changes of the intensity gradients in the image components;
processing of error minimization, comprising the steps of:
decomposing, scaling and skeletonizing image components;
searching for intensity changes by means of gradient changes and morphological branch search;
filling of the characteristics vector;
minimizing errors;
counting of intersection points and definition of $I_{eye}$;
defining $I_{eye}$,
applying a cropping operation on $I_{eye}$ to generate an image $I_{roi}(i; j)$, wherein $I_{roi} \subset I_{eye}$ for $$I_{gs}(i, j) = \frac{\sum_{s=1}^{3} \sum_{t=1}^{3} K_s(s, t) I_{rg}(i + s, j + t)}{\sum_{s=-1}^{3} \sum_{t=-1}^{3} K_s(s \cdot t)}$$

$\alpha \leq i \leq M$ and $\beta \leq j \leq N$, $\alpha \geq 1$, $\beta \geq 1$, $\alpha$, $\beta \in \mathbb{Z}$, and further wherein, $I_{roi}$ must contain two intersections of eye vessels, $p_1(x_{p1}, y_{p1})$ and $p_2(x_{p2}, y_{p2})$ as follows:
applying a median filter using the following steps:
converting $I_{ori}(i, j)$ to $I_{mg}(i, j)$, a greyscale representation where $p_{x,y} \in [0, L]$ for data set reduction;
applying a mean kernel ($K_s$) on $I_{rg}$ to reduce noise, wherein $I_{gs}$ is the averaged image and $k_{22}$ is the kernel,
performing a binarization of the image using the following steps:

$$K = \begin{bmatrix} k_{11} & k_{12} & k_{13} \\ k_{21} & k_{22} & k_{23} \\ k_{31} & k_{32} & k_{33} \end{bmatrix} K_s = \frac{1}{9}\begin{bmatrix} 1 & 1 & 1 \\ 1 & 1 & 1 \\ 1 & 1 & 1 \end{bmatrix}$$

applying during image processing, a gradient using directional kernels, wherein $K_{Gx}$ and $K_{Gy}$ are directional kernels of dimension 3×3, wherein said gradient is $$I_{gm} = \sqrt{(K_{Gx}(I_{gs}))^2 + (K_{Gy}(I_{gs}))^2}$$

obtaining the magnitude of the image gradient, where $I_{gm}$ identifies the local illumination variation and the direction of maximum gray intensity changes for $I_{gs}$;
determining if the noise has been removed from the image using the following steps:
binarizing the $I_{gs}$ images using Otsu's method to generate a black and white image $I_{bw}$;
obtaining $I_{fn}$ which is the resulting noise-free image;
performing a noise removal on the image through morphological operations and automatic identification of objects called noise (objects with are a less than 200 pixels);
obtaining $I_{fn}$ which is the resulting image free of noise;
skeletonizing the noise-free image $I_{fn}$ through morphological operations,
identifying vascular intersections and distance measurement between them, comprising the following steps:
skeletonizing $I_{fn}$ using mathematical morphological operations;
removing pixels at the boundaries of the objects,
maintaining the objects together;
preserving the Euler number;

storing spatial coordinates of the intersections;

obtaining $I_{sk}$ as a final image;

performing a rigid body transformation consisting of scaling, rotating and translating the image;

performing image segmentation and feature extraction;

performing statistical feature extraction to obtain characteristics of the image thereby obtaining energy, entropy, homogeneity, contrast, brightness, correlation, RGB mean, R-mean, G-mean and B-mean; and using an artificial neural network classifier to estimate the thickness of the macula and classifying a result.

2. A portable system for detecting potential cases of diabetic macular oedema according to claim 1, wherein the portable system does not require an optical coherence tomography study to be performed and does not require information to be sent to a diagnostic center and/or any specialist for review.

3. The portable system for detecting potential cases of diabetic macular oedema using image processing according to claim 1, wherein the microprocessor has at least 1 GB of RAM at 1.4 GHz and a 64-bit processor.

4. The portable system for detecting potential cases of diabetic macular edema by processing a fundus image according to claim 1, wherein short-range wireless connection module for receiving data is a shortrange wireless technology, infrared or a low-power wireless mesh network standard-based specification for a suite of high-level communication type.

* * * * *